Jan. 27, 1925.

J. SHANNON, JR 1,524,111

ADVERTISING OR DISPLAY APPARATUS

Filed Oct. 5, 1923 5 Sheets—Sheet 1

Inventor:
John Shannon, Junior,
By [signature]
Attorney

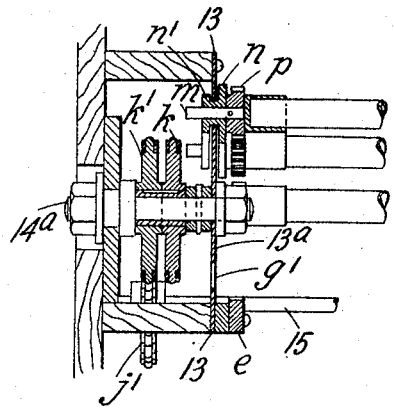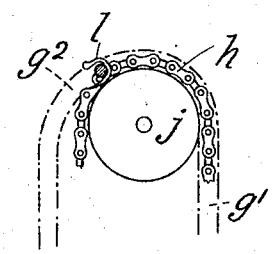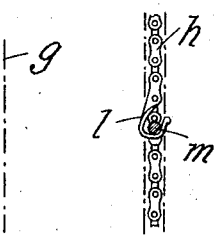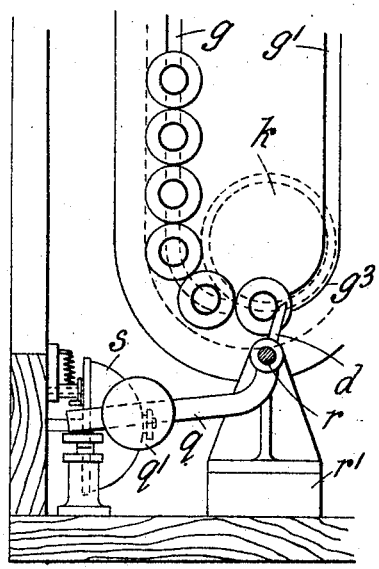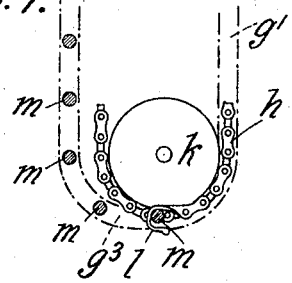

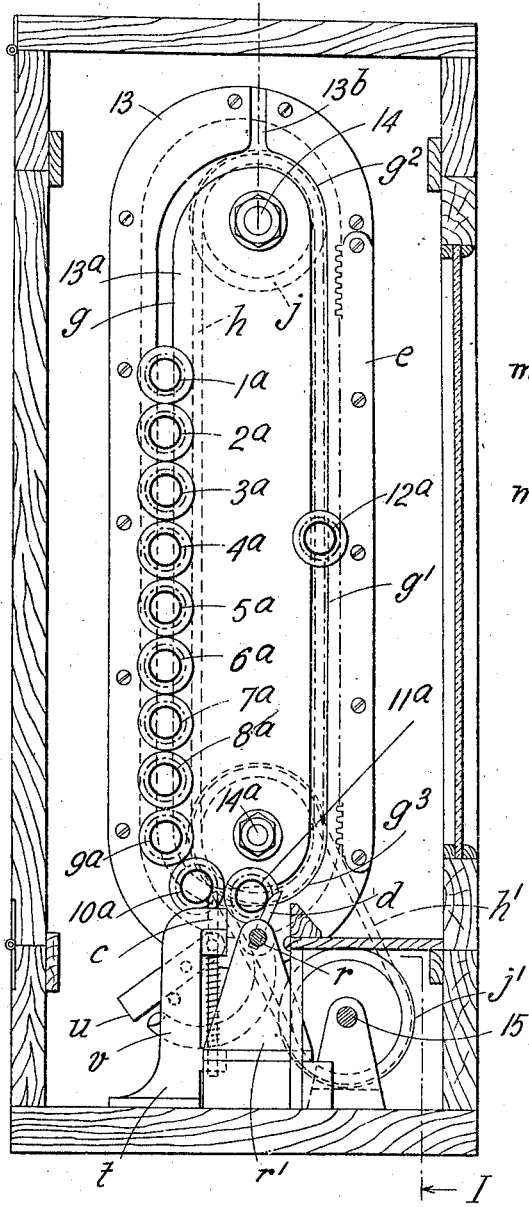
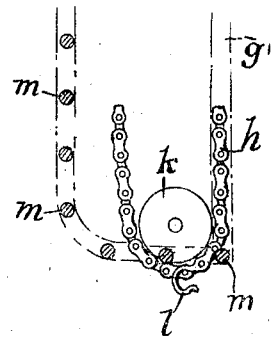

Jan. 27, 1925.
J. SHANNON, JR
1,524,111
ADVERTISING OR DISPLAY APPARATUS
Filed Oct. 5, 1923     5 Sheets-Sheet 4
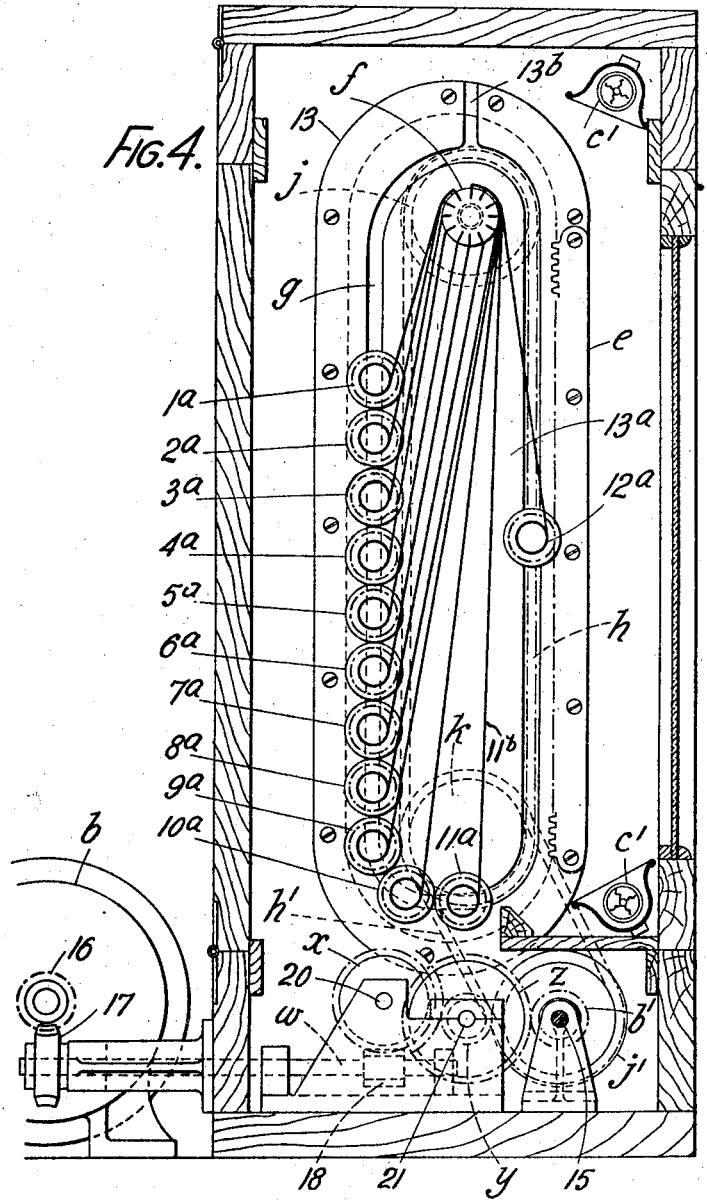
Inventor:
John Shannon, Junior,
By
Attorney.

Jan. 27, 1925.
J. SHANNON, JR
1,524,111
ADVERTISING OR DISPLAY APPARATUS
Filed Oct. 5, 1923   5 Sheets-Sheet 5
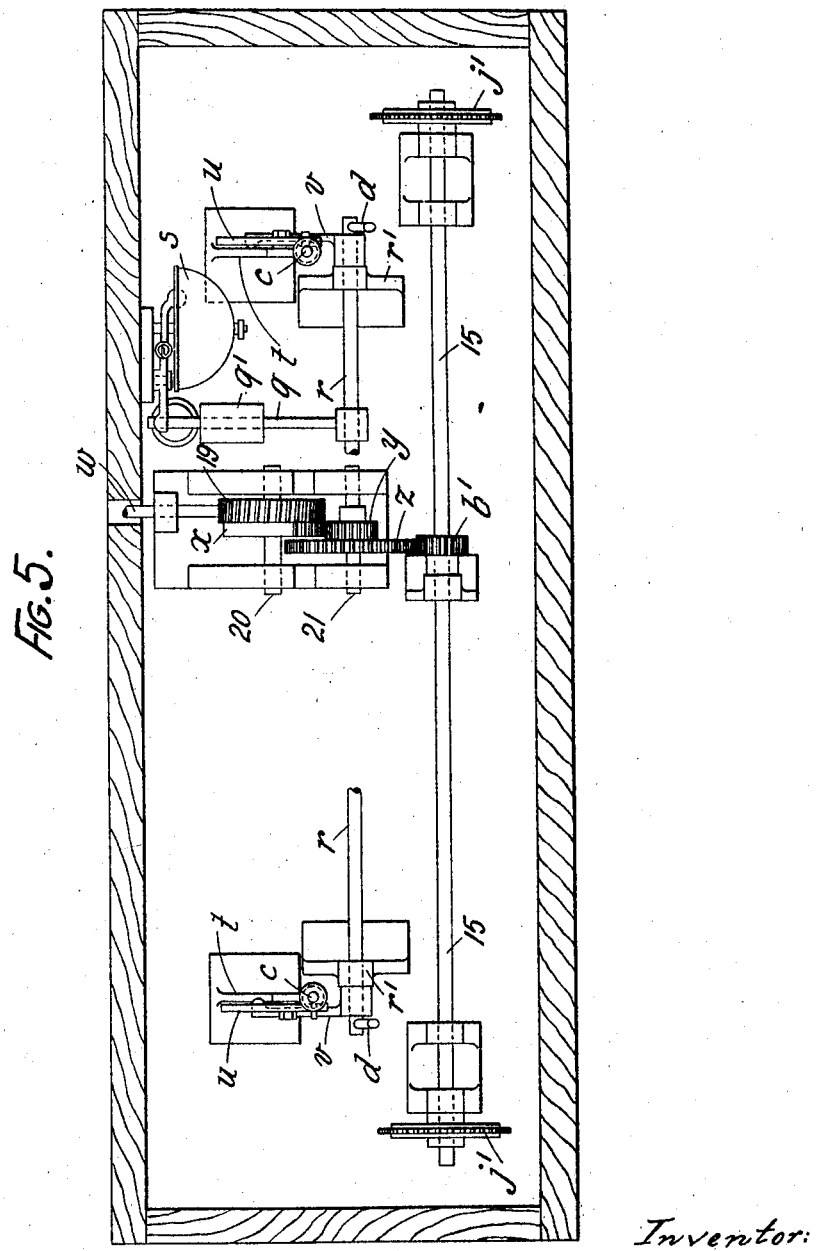
Inventor:
John Shannon, Junior,
By
Attorney Patented Jan. 27, 1925.

1,524,111

UNITED STATES PATENT OFFICE.

JOHN SHANNON, JR., OF BELFAST, IRELAND, ASSIGNOR TO SHANNON SHAW MACHINES, LIMITED, OF BELFAST, IRELAND.

ADVERTISING OR DISPLAY APPARATUS.

Application filed October 5, 1923. Serial No. 666,765.

*To all whom it may concern:*

Be it known that I, JOHN SHANNON, Junior, a subject of the King of England, residing at 142 Old Park Road, Belfast, Ireland, have invented certain new and useful Improvements in or Relating to Advertising or Display Apparatus, of which the following is a specification.

The present invention relates to advertising or display apparatus of the kind in which a number of pictures, inscriptions or the like are automatically and successively exhibited to view for a pre-determined period of time, and has for its object to provide an improved self-contained apparatus of restricted dimensions in which relatively large advertising matter may be exhibited and may also be readily exchanged.

Various forms of advertising or like devices have been proposed wherein an advertisement is exposed to view for a time and then replaced by another. In some cases the advertisements are arranged on sheets lying one in front of another, mechanism being provided whereby a transverse rod is arranged to travel behind the sheet being exhibited and draw it up in a loop drop or deposit it at the back of the last sheet of the series, and thus revealing the next advertisement. In other cases the advertisements are arranged in the form of an endless circle, each section containing an advertisement having a roller attached to its lower end, this roller being rotated, frictionally or up gearing, in order to roll by the section after it has been exhibited and to simultaneously unroll the next section, which thus travels upwards during part of the time that it is on view.

The present invention relates to an advertising or show device embodying both of these features, that is to say, the advertisements are on separate sheets, and not on a continuous web, and the change is effected by rolling up the sheet last exhibited and showing the sheet behind, which is stationary during the whole time of its exhibition.

The accompanying drawings show, by way of example, a form of construction of an apparatus embodying this invention.

Fig. 2 is a section of the lower parts only on the line 2—2 of Fig. 1 while

Fig. 3 is a section on the line 3—3 (Fig. 1) and

Figure 1:
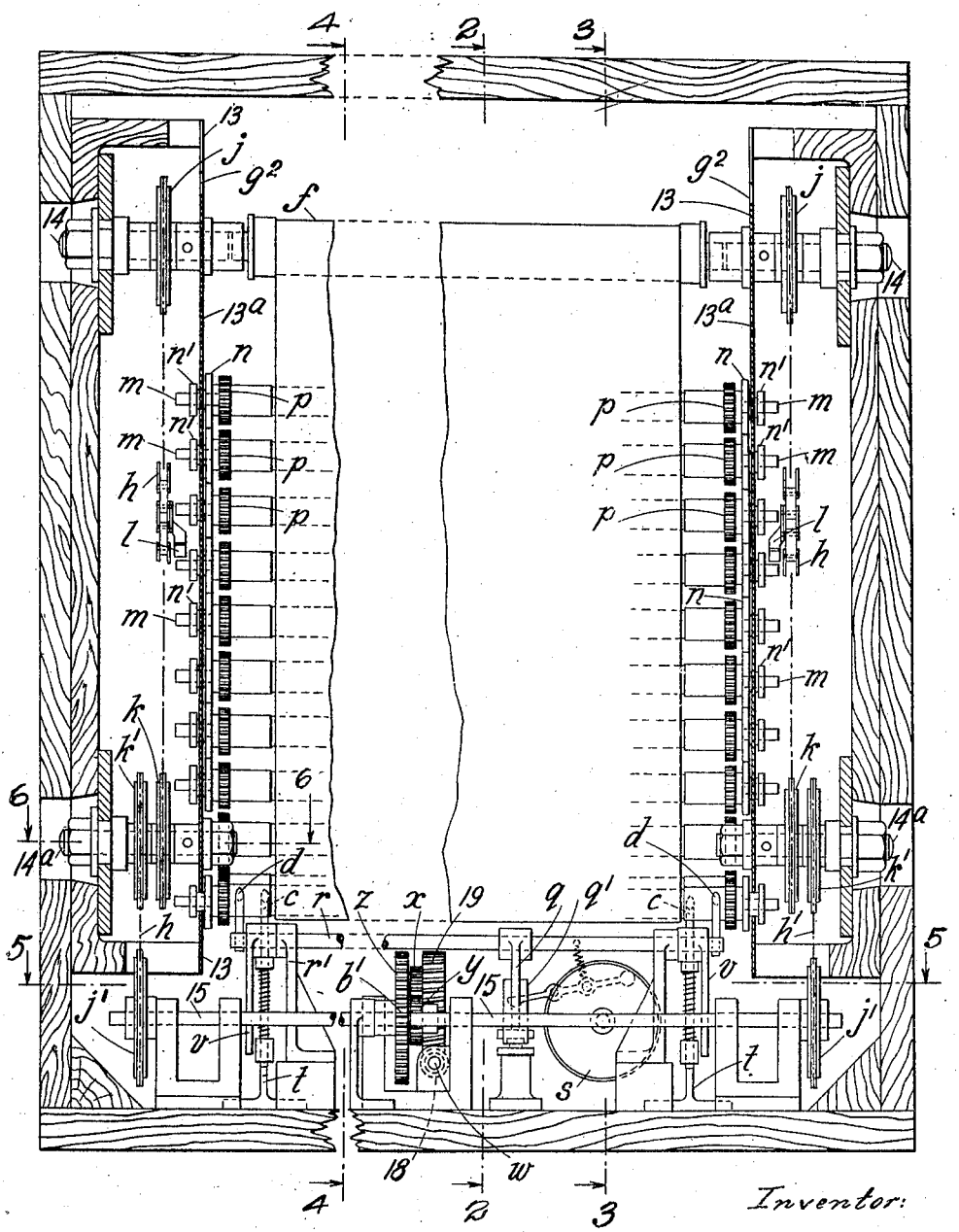
Fig. 1 is a sectional elevation of the apparatus on the line 1—1 of Fig. 3.

Fig. 4 a section on the line 4—4 (Fig. 1).

Fig. 5 is a sectional plan on the line 5—5 of Fig. 1 showing the driving gear and Fig. 6 is a horizontal section on the line 6—6 of Fig. 1.

Figs. 7, 8 and 9 show details of the roller lifting device in three different positions.

Fig. 10 shows a modification of the endless tracks.

In a cabinet having a transparent panel in its front is pivotally mounted near its top and parallel to the front of the cabinet, a roller $f$ hereinafter called the sheet-holder to which a convenient number of flexible show bills or flexible sheets serving as supports for show bills or devices to be exhibited are securely attached.

The other free ends of said show bills are each secured to one of a series of travelling rollers $1^a$ to $12^a$ (Fig. 4) upon which they are adapted to automatically and alternately unwind and wind themselves in such a way that each of the several show bills is in turn unwound and exhibited for a predetermined period of time behind the glass panel referred to and after such period is automatically wound up and lifted over the sheet holder thereby exposing to view another show bill which has automatically taken its place.

The rollers $1^a$—$12^a$ carry loosely mounted on their ends $m$ sleeves with flanges $n$ and $n'$ which firstly serve as journal bearings for the rollers, secondly constitute guides for their travels along endless slots or channels and thirdly, as regards their flanges $n$— which exceed in diameter a roller with fully rolled up show bill,—act as distance or spacing discs. The rollers are further provided at each end, with fixed pinions $p$ adapted to engage racks $e$ adjacent the front parts of guide channels for the roller ends.

The endless channels referred to and substantially of the shape of an elongated O, comprise straight vertical courses $g$ and $g^1$ and top and bottom connecting arcs $g^2$ and $g^3$ and are arranged at or near both sides of the cabinet, being preferably formed in sheet metal plates or partitions 13, 13$^a$, the parts 13$^a$ whereof, which are inside the channels, being secured in position by means of distance bolts 14 and 14$^a$. On these bolts, the upper ones of which preferably also serve as pivots for the sheet holder $f$, are mounted sprocket wheels $j$ and $k$ respectively, for the endless chains $h$, and they are arranged concentrically with the forward sectors of 90° of the arcuate parts $g^2$ and $g^3$ of the channels. The diameter of these forward sectors, that is the parts of arcs $g^2$ and $g^3$ lying in front of a plane through the axis of the sprocket wheels $j$ and $k$ is equal to the diameter of the pitch circle of the latter. It follows therefore that in the front part of the channels the path followed by the rollers is in alignment with the path of chains $h$. The arcuate parts of the channels behind the said plane, however, are of greater radius than the pitch circle (see Figs. 3, 4 and 9) so that the chains and channels follow paths which are out of alignment, the path of the latter extending towards the rear, away from the chain path.

The rollers 1$^a$ to 12$^a$ with show bills wound up are inserted through slots 13$^b$ provided at the top of the channels and pass down the substantially straight channels $g$ at the back, the foremost rollers passing into the curved part $g^3$ at the bottom, the plates 13, 13$^a$ being between the discs $n$ and $n^1$ (Fig. 1). The rollers thus stored rest with their spacing discs $n$ one on the other and in descending have unrolled or partly unrolled their show bills, the foremost roller 11$^a$ (Fig. 4) which rests at the bottom of curve $g^3$ displaying its bill 11$^b$ to its full length, while those of the rollers 10$^a$ to 1$^a$ are unrolled only to an extent proportionate to their distance from the sheet holder $f$ and are, of course, hidden from view by the bill 11$^b$. The second roller 10$^a$ is arrested in its travel by detents $c$ which prevent the weight of the rollers behind from forcing the roller 11$^a$ upwards in the front part of the channel.

After the desired period for exhibition has expired the roller 11$^a$ is picked up by means hereinafter to be described, and carried into and up the straight part of the front channels $g^1$, during which movement the pinions $p$ rigidly mounted at both ends of the roller engage with the stationary racks $e$ provided adjacent to the said channels and thereby cause the roller, as for example the roller 12$^a$ shown in Figs. 3 and 4, to be rotated in such a way that the show bill is wound up on it. When the roller has passed the summit of the curved channel $g^2$ it is automatically released and continues its travel by its own weight on the down grade of the curve into the straight channel $g$ where it comes to rest on the hindmost roller 1$^a$ and has in its course partly unwound the show bill, while the tension of the show bill causes the sheet holder $f$ to be slightly rotated.

The roller 11$^a$ when starting on its winding-up motion meets in its path with two lever arms $d$ rigidly mounted on a transverse shaft $r$, carried in brackets $r^1$, and by depressing these arms it causes the shaft $r$ to rock two curved lever-arms $v$ mounted on it, thereby lifting one arm of each of two double levers $u$ pivoted on brackets $t$. The other arm of the levers $u$ thus operated act upon arms of the spring actuated detents $c$ which are thereby drawn out of the path of the next following roller 10$^a$ and allow the latter to advance under the weight of the rollers 9$^a$ etc., behind it. Immediately the roller 11$^a$ has cleared the levers $d$ the latter spring back into their initial position in the path of the following rollers, under the action of the counterweight $q^1$ mounted on an arm $q$ on the shaft $r$; the consequent swinging back of the levers $v$ releases the levers $u$ and allows the detents $c$ to rise under spring pressure behind roller 10$^a$ but in front of the next roller 9$^a$.

The rollers are picked up in turn when in their lowermost position (11$^a$ Figs. 3 and 4) by two hooks $l$ fastened directly opposite each other each to the endless chains $h$ hereinbefore referred to, the hooks engaging the roller ends $m$, and are carried up the straight channels $g^1$ (Fig. 8) as the chains move up, thereby rolling up the show bill in the manner described, and carrying the roller over the top of the sheet holder back to the straight rear channels $g$. As will be seen in Fig. 9 after the hooks $l$ have passed the summit, the roller will by its weight drop out of the hooks and outrun them so that the latter can descend down their own path, clear of the roller ends $m$.

The endless chains $h$ are driven from a counter-shaft 15 arranged in the base of the cabinet, by means of sprocket wheels $j^1$, chains $h^1$ and sprocket wheels $k^1$ mounted on bolts 14$^a$ and connected by any suitable means to the sprocket wheels $k$. The counter-shaft receives intermittent rotary motion through a train of gears comprising a mutilated spur wheel $x$ which is constantly driven from the motor $b$ by means of worm gear 16, 17, shaft $w$, worm 18 and worm-wheel 19 keyed on the shaft 20 together with the mutilated spur wheel $x$, which, during the period when the toothed part of its circumference is in mesh with the pinion $y$, transmits the motion through the spur wheel $z$ on shaft 21 to pinion $b^1$ on the counter-shaft 15. The extent of the toothed part of the mutilated gear wheel is so calculated that the hooks $l$ travel exactly over one complete circuit of the course described by the chain, while its blank part, when it runs clear of the pinion $y$, is measured to correspond to the predetermined period of time allowed for exhibition of each show bill.

An alarm $s$ by which the change of show bill is signalled may be arranged to be operated by the lever arm $q$ of shaft $r$ as shown in Figs. 1 and 2.

Limelights or electric lights $c^1$ (Fig. 4) or other means for illuminating the show bills may be provided preferably mounted inside the cabinet as shown in the drawing.

While the drawings illustrate a specific form of construction and arrangement, it is understood that any particular detail may be replaced by equivalent devices or arrangements without prejudice to the main principles of the invention, while the latter is not of course limited to the particular arrangement of mechanism whereby the desired exhibition and rolling up of the sheets is effected.

The operation of the apparatus, stated briefly, is substantially as follows:—Taking, for example, the roller $11^a$ (Fig. 4) at the bottom of the endless trackway formed by the channels $g$, $g^1$, $g^2$, $g^3$, that roller is disposed in contact with the releasing levers $d$, and is free of engagement with the chains $h$ and their pick-up hooks $l$, its show bill being completely unwound. It remains in this position during the period that the show bill is to be displayed, owing to the fact that the rollers behind it are arrested, due to the engagement of the roller $10^a$ immediately succeeding it by the detents $c$.

During this display period, the chains $h$ are idle, because the blank or untoothed part of the mutilated gear $x$ is then travelling opposite the pinion $y$, so that the latter remains stationary. When, however, the aforesaid blank part of gear $x$ passes beyond pinion $y$, and its toothed part starts to mesh therewith, said pinion will be driven and its motion will be transmitted, through gears $z$ and $b^1$ to counter-shaft 15, and thence, through sprockets $j^1$, and chains $h^1$ and sprockets $k^1$, to sprockets $k$ and chains $h$, which latter will thereby be driven. The movement of chains $h$ will cause their hooks $l$ to pick up the ends $m$ of roller $11^a$ which will thus be carried forward into the lower end of the vertical front course $g^1$ of the trackway and then upward through said course, and will ultimately be carried into and through the upper arcuate part $g^2$ of the trackway and, hence, over the holder $f$; during which upward movement the pinions $p$ on the ends of the roller will be rotated by their engagement with the racks $e$ and the show bill will be wound up. As the roller reaches the summit of the arcuate part $g^2$—i. e., the limit of its upward movement—it disengages itself by gravity from the pick-up hooks $l$ on the chains, completes its movement through part $g^2$ and descends into the upper part of the rear vertical course $g$ of the trackway, where it falls upon the then uppermost roller $1^a$ in said course; and at the same, or substantially the same time, the toothed part of gear $x$ leaves pinion $y$ and its blank part again comes opposite said pinion, whereupon the chains $h$ again cease their movement.

Reverting to the initial movement of roller $11^a$ caused by its engagement with the pick-up hooks on the then moving chains $h$, such movement of the roller results in forcing levers $d$ to swing or rock in a clockwise direction (Fig. 3), thus rocking shaft $r$ and, in consequence, swinging levers $v$ leftward and upward, and causing them to lift the adjacent arms of the double levers $u$. The other arms of said levers $u$ are thereby swung downward, carrying with them the aforesaid detents $c$, which are thus withdrawn from the path of the roller $10^a$, that roller thereupon assuming the position formerly occupied by roller $11^a$. The cycle of movements above described is then repeated, the detents $c$ being automatically returned to their original operative position as soon as roller $11^a$ passes beyond levers $d$, due to the action of the counterweight $q^1$ and connected parts. The signal $s$ is actuated automatically by the weight-carrying arm $q$ on shaft $r$ when the latter is rocked consequent upon the depression of levers $d$ by roller $11^a$, thereby indicating that a change in rollers is taking place.

Instead of giving the endless tracks or channels, for guiding the rods, a curved or arc formation at their lower front portions, which necessitates the provision of fingers or stops to prevent the foremost roller (for example $11^a$ Figure 4)—the advertisement of which is being displayed—from being forced upwards under the weight of the rollers behind it, I may make the forward lower part of the endless tracks right-angular or substantially so, as represented in Fig. 10 so that the foremost roller cannot pass upwards in the channels, under pressure of the following rollers, but must be positively raised by the lifting device.

What I claim and desire to protect by Letters Patent is:—

1. In a display apparatus, the combination of a vertical trackway; a set of rollers adapted to travel therein; a rotatable holder at one end of the trackway; a flexible sheet individual to each roller attached thereto at one end and at the other end to the holder so as to be unwound during the movement of the roller away from said holder;

carrier mechanism to pick up the rollers at the bottom of the trackway, carry them up one side thereof and then release them at the top of said side to travel by gravity down the other side, said rollers passing around the holder during their travel; and means for automatically rewinding the sheets during the movement of their rollers toward the holder.

2. A display apparatus, according to claim 1, in which the trackway embodies front and rear parallel vertical courses, and arcuate top and bottom portions connecting the same at opposite ends; and in which the rotatable holder is disposed at the top of trackway, so that the rollers are carried upwardly along the front course of the trackway by the carrier mechanism, moved over the holder and then released in position to descend by gravity through the rear course.

3. In a display apparatus, the combination of a trackway, embodying parallel vertical courses and top and bottom connecting portions therebetween; a set of rollers adapted to travel therein; a rotatable holder at the top of the trackway; a flexible sheet individual to each roller attached thereto at one end and at the other end to the holder so as to be unwound during the movement of the roller away from said holder; chain-and-sprocket mechanism for picking up the rollers at the bottom of the trackway, carrying them upward along one course thereof and over the holder and then releasing them in position to descend by gravity through the other course; and means for automatically rewinding the sheets during the movement of their rollers toward the holder.

4. In a display apparatus, the combination of a vertical trackway; a set of rollers adapted to travel therein; a rotatable holder at one end of the trackway; a flexible sheet individual to each roller attached thereto at one end and at the other end to the holder so as to be unwound during the movement of the roller away from said holder; carrier mechanism for picking up the rollers at the bottom of the trackway, carrying them up one side thereof and then releasing them at the top of said side to travel by gravity down the other side, said rollers passing around the holder during their travel; means for automatically rewinding the sheets during the movement of their rollers toward the holder; and automatically controlled mechanism for delivering the rollers one at a time from the last-named trackway side to the carrier mechanism to be picked up thereby.

5. In a display apparatus, the combination of a trackway embodying parallel vertical courses and top and bottom connecting portions therebetween; a set of rollers adapted to travel therein; a rotatable holder at the top of the trackway; a flexible sheet individual to each roller attached thereto at one end and at the other end to the holder so as to be unwound during the movement of the roller away from said holder; chain-and-sprocket mechanism for picking up the rollers at the bottom of the trackway, carrying them upward along one course thereof and over the holder and then releasing them in position to descend by gravity through the other course; means for automatically re-winding the sheets during the movement of their rollers toward the holder; and automatically controlled mechanism for delivering the rollers one at a time from the last-named trackway side to the carrier mechanism to be picked up thereby.

6. In a display apparatus, the combination of a trackway embodying parallel vertical courses and top and bottom connecting portions therebetween; a set of rollers adapted to travel therein; a rotatable holder at the top of the trackway; a flexible sheet individual to each roller attached thereto at one end and at the other end to the holder so as to be unwound during the movement of the roller away from said holder; chain-and-sprocket mechanism for picking up the rollers at the bottom of the trackway, carrying them upward along one course thereof and over the holder and then releasing them in position to descend by gravity through the other course; means for automatically rewinding the sheets during the movement of their rollers toward the holder; and means under the control of the chain-and-sprocket mechanism for releasing the rollers one at a time from the last-named course to move into position to be picked up by said chain-and-sprocket mechanism.

7. Display apparatus according to claim 6, in which the releasing means comprises a stop device normally engaging the next to the lowermost roller to arrest its progress, but automatically releasable therefrom consequent upon the picking up of the lowermost roller by the chain-and-sprocket mechanism.

8. A display apparatus comprising a container, a rotatable sheet holder mounted therein, endless channels at either side of the container, transverse rods engaging in said channels, a plurality of flexible sheets having their top and bottom edges attached respectively to said holder and rods, pinions on the ends of the rods, travelling means for engaging and raising the rods from the bottom to the top of the container and means for intermittently driving the raising means, and means adjacent to the channels for engaging the pinions and rotating them with their rods along part of the endless channels, substantially as set forth.

9. A display apparatus comprising a container, a rotatable sheet holder in the top of the container, endless guide channels at the sides of the container, a plurality of transverse rods having their ends projecting into said channels, loose guide and distance sleeves on the ends of said rods, means on the rods and means in the container for causing the rods to be rotated about their axes when they are raised, means for engaging the rods when in their lowest position and raising them up over the top of the sheet holder, endless chains carrying said rod engaging means, and means for intermittently driving said chains, substantially as described.

10. A display apparatus comprising a container, a series of flexible display sheets each having a carrier rod associated with it, a rotatable holder in the top of the container to which the upper edges of the sheets are attached, means for intermittently and consecutively rolling up the sheets and passing them over the top of the holder for further display, and means for preventing, while a sheet is being displayed, the remaining partly rolled up sheets stacked in the rear part of the endless channels from forcing upwards, by their weight, the rod of the sheet being exhibited, substantially as described.

11. A display apparatus comprising a cabinet, a sheet holder rotatably mounted transversely in the upper part of the cabinet, endless guide channels at the sides of the cabinet, a series of flexible sheets attached to the sheet holder at their upper ends, a series of rods attached to the lower ends of the sheets and having their ends entering said channels, stationary racks at the sides of the cabinet, toothed pinions fast on the rods and adapted to engage the racks when they pass into the front vertical portions of said guide channels, endless chains adjacent to the guide channels and carrying means for engaging and raising the rods one by one as they reach the bottom of the guide channels, and means for intermittently driving said chains, substantially as described.

JOHN SHANNON, Junr.

Witnessed by—
A. H. R. Carr,
P. Shaw.